(12) United States Patent
Shim

(10) Patent No.: US 6,907,277 B1
(45) Date of Patent: Jun. 14, 2005

(54) VOICE-BASED PHONE ALERT SIGNAL

(75) Inventor: Jae H. Shim, San Jose, CA (US)

(73) Assignee: Mobigence, Inc., San Jose, CA (US)

(*) Notice: Subject to any disclaimer, the term of this patent is extended or adjusted under 35 U.S.C. 154(b) by 619 days.

(21) Appl. No.: 09/844,757

(22) Filed: Apr. 26, 2001

(51) Int. Cl.$^7$ ................................................ H04B 1/38
(52) U.S. Cl. ........................ 455/567; 455/563; 455/415
(58) Field of Search ................................ 455/567, 563, 455/415, 414, 413, 467, 417; 379/68, 76, 88.21

(56) References Cited

U.S. PATENT DOCUMENTS

| | | | | |
|---|---|---|---|---|
| 4,899,358 A | * | 2/1990 | Blakley | 379/284 |
| 5,117,449 A | * | 5/1992 | Metroka et al. | 455/552.1 |
| 5,265,264 A | * | 11/1993 | Dzung et al. | 455/90.2 |
| 5,526,406 A | * | 6/1996 | Luneau | 455/563 |
| 5,646,979 A | * | 7/1997 | Knuth | 455/563 |
| 5,854,826 A | * | 12/1998 | Kim | 379/68 |
| 6,038,441 A | * | 3/2000 | Slaven et al. | 455/413 |
| 6,408,177 B1 | * | 6/2002 | Parikh et al. | 455/414.4 |
| 2003/0068020 A1 | * | 4/2003 | Hamrick et al. | 379/88.21 |

* cited by examiner

Primary Examiner—Nick Corsaro
Assistant Examiner—Tan Trinh

(57) ABSTRACT

Method and system for providing a notification of an incoming call on a radiotelephone. When a signal indicating receipt of an incoming call is sensed, the radiotelephone provides a voice-based incoming call notification signal, using words spoken by a selected user or synthesized by a voice synthesizer to provide and alert (DA) signal that distinguishable from most or all other incoming call notification signals provided by other radiotelephones that may be nearby. The sound intensity level for the notification signal can be varied according to (i) background sound level present, (ii) estimated distance from the radiotelephone to a user and/or (iii) time delay by the user in responding to the incoming call. The notification signal can be personalized by reference to a source of the incoming call, using an on-board database.

20 Claims, 3 Drawing Sheets

VOICE-BASED PHONE ALERT SIGNAL

FIELD OF THE INVENTION

This invention relates to a system providing an alert signal for an incoming phone call for a handheld radiotelephone.

BACKGROUND OF THE INVENTION

Conventional handheld radiotelephones provide alert signals to a user for an incoming call, using two different mechanisms. A first type of alert is provided as a mechanical ringing sound (referred to herein as "ringing"), using an off electronic signalling device, such as a buzzer or loudspeaker. This mechanical ringing is provided in different cadences and with different loudness levels so that a user can select and fix a cadence and a sound intensity preferred by that user. A second type of alert is provided by mechanical vibration using, for example, an electromechanical vibrator that is embedded in the radiotelephone. A vibrator mechanically vibrates the entire radiotelephone in communicating an alert signal and thus provides a relatively silent or unobtrusive alert signal. By contrast, ringing is used to communicate a relatively obtrusive, non-silent alert signal. Most users choose, or accept, a ringing alert for most purposes, except where a meeting or similar event is occurring. A ringing alert signal may be a conventional signal with a unique set of cadences, a sequence of one or more musical notes, or a similar signal.

Conventional radiotelephones made by a single vendor, or manufactured according to closely related models, often provide (nearly) identical ringing alert signals. As such, in a group of adjacent radiotelephone users, it is sometimes difficult to determine whose device is actually ringing for an incoming call: each of two or more radiotelephone users reaches for and attempts to activate his or her radiotelephone at the same time in response to the incoming call. Identifying whose radiotelephone is actually responding to the incoming call requires greater attention to detail and more careful listening by radiotelephone users in such a group. Further, presence of the mechanical ringing often disturbs others who are not part of the fraternity of habitual radiotelephone users.

Another issue with use of ringing alert signals for a conventional radiotelephone is that, once the loudness or sound intensity is selected by the user, that sound level is fixed for all environments, until the user takes the trouble to change the sound level. A selected (and fixed) sound level may be too low in a noisy environment and may be too high and intrusive in an intimate, low key environment.

What is needed is a radiotelephone that provides a unique and easily distinguishable alert signal, such as a distinguishable human voice that is easily recognized by the targeted user and by other radiotelephone users whose devices are not presently receiving an incoming call notification. Preferably, the initial sound intensity and the subsequent sound intensity for this distinguishable alert ("DA") signal will vary automatically according to (i) noise level in the local environment and (ii) estimated distance of the user from the device when the incoming call is received.

SUMMARY OF THE INVENTION

These needs are met by the invention, which uses a human voice, or a machine-produced facsimile of a human voice, to provide a DA signal that is easily distinguished from other incoming call alert signals. Optionally, the user can provide a facsimile of his or her own voice as part or all of the DA signal. Content of the user's DA signal may include a phrase such as "Knock, knock, knock. You have a call." or "Hello James, you have an incoming call." or a more cryptic "Pick up your cellphone, please." or any other suitable message. The voice used to deliver the incoming call signal may be that of the user or of a selected second person who has a pleasing or distinctive-and-not-necessarily-pleasing voice or may be a synthesized voice (collectively referred to herein as a "voice-based" signal).

Optionally, the system provides one or more of three types of adaptive sound level control. The initial sound intensity of the DA signal may be determined by a local environment sound level (treated as noise), as measured by a sound level sensor associated with the radiotelephone. The initial sound intensity may be determined according to an estimated distance of the user from the user's radiotelephone at the time the incoming call is received, as measured by a proximity sensor associated with the radiotelephone and/or carried on or attached to the user. The DA signal may be repeated at successively greater sound intensities for each successive DA signal sequence, whenever the user does not respond to the first DA signal that is issued in response to receipt of an incoming call.

DESCRIPTION OF BEST MODES OF THE INVENTION

Figure 1:
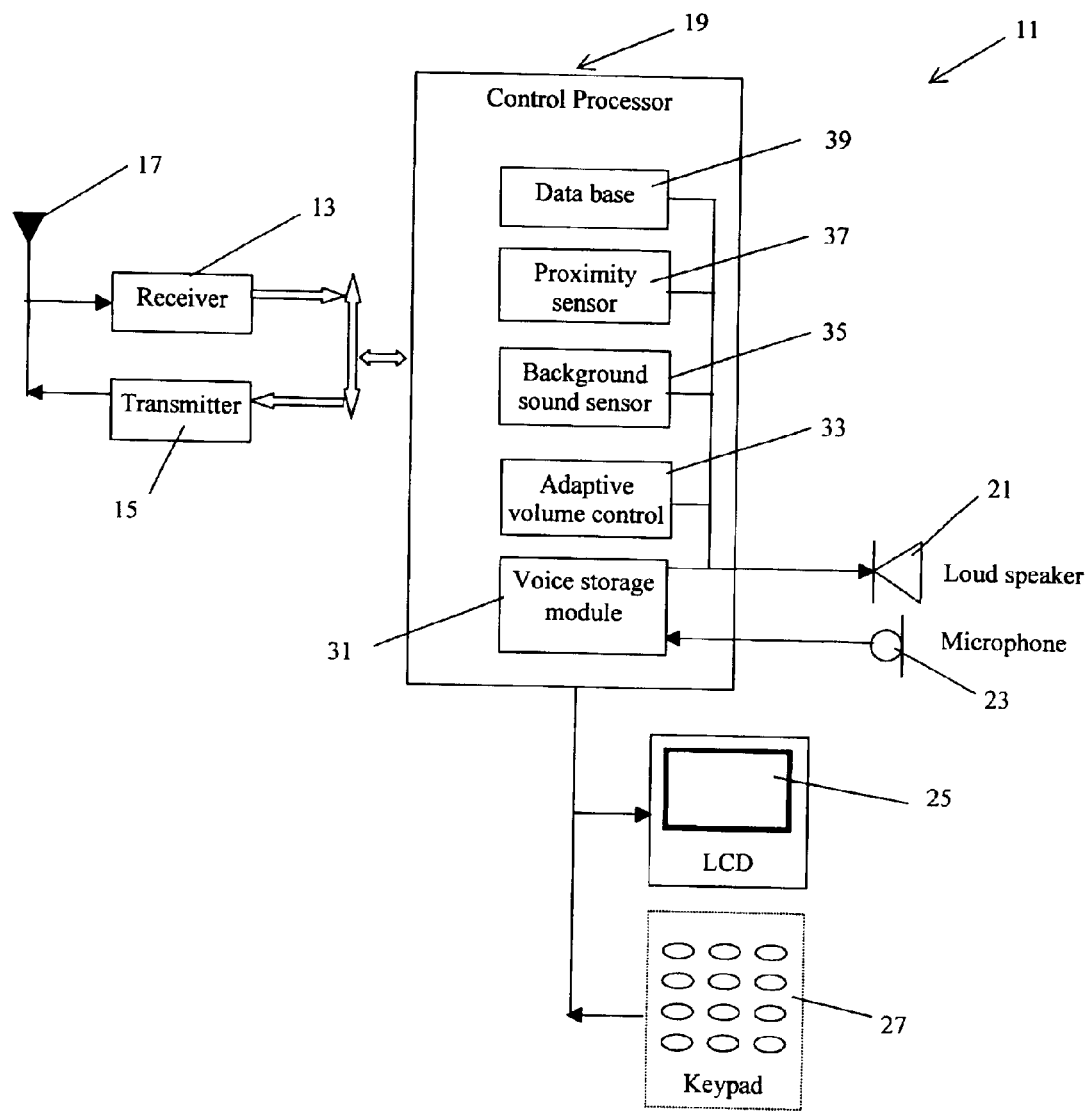
FIG. 1 illustrates a radiotelephone constructed according to the invention.

FIG. 1 illustrates a radiotelephone system 11 configured to practice the invention. The system 11 includes a signal receiver 13, a signal transmitter 15 and a signal antenna 17, connected to and controlled by a control processor 19, a loud speaker 21 and a microphone 23 that serve as audio interfaces for a radiotelephone user, and an LCD display 25 and a key pad 27 that serve as information display and information entry interfaces, respectively, for the radiotelephone system. Optionally, the receiver 13, transmitter 15, antenna 17, loudspeaker 21 and microphone 23 may be conventionally constructed.

The control processor 19 includes conventional incoming and outgoing signal processing components, plus a voice storage module 31, an adaptive volume control 33, a background sound (noise) sensor 35, a user proximity sensor 37 and a data base 39. In one embodiment, the receiver 13 receives an incoming call through the antenna 17 and informs the control processor of this incoming call. The control processor 19 activates the voice storage module 31, which delivers a pre-recorded, voice-based distinguishable alert (DA) signal including three, four, five or more audibly perceptible, voice-based words, such as "Knock, knock, knock. You have a call." or "Hello James, you have an incoming call." or a more cryptic "Pick up your cellphone, please." or any other suitable message. The voice used to deliver this message may be the user's own voice, which the user can easily distinguish from a conventional radiotelephone incoming call signal and from an incoming call signal that is directed to another radiotelephone user. One advantage of using the user's own voice for the incoming call signal is that the user can more readily distinguish his or her own voice from others' voices, even where two or more users in a group have the same radiotelephone model. Alternatively, the voice used to deliver this message may be that of another person who has a distinguishable, or easily recognizable, voice quality or may be a synthesized voice. With either choice, the radiotelephone user receives a voice-based DA signal indicating that the user is receiving an incoming call.

Optionally, if caller ID is active for the user's radiotelephone, the system 11 determines the phone number for the source of the incoming call, consults the on-board data base 39 and determines if the phone number is a recognized number within the database. If the source phone number is not a recognized number, the system 11 provides a DA signal that optionally does not include this source phone number. The user can optionally add this unrecognized source phone number to the data base 39, if the user believes that incoming calls are likely to be received from this source phone number in the future. The user can optionally delete a source phone number from the database 39 if this phone number is no longer a likely source of incoming calls.

If the source phone number is a recognized number, already contained within the database 39, the voice storage module 31 adds to the DA signal an indication of the source of the incoming call, for example as "You have an incoming call from your accountant, Ms. Smith." Optionally, a phrase containing this additional information identifying the source of the incoming call ("You have an incoming call from [named person]") is pre-recorded and stored for instant access, using a waveform approach, for each source phone number in the database 39. Alternatively, this phrase is added by voice synthesis, using a synthesis approach. With either approach, the recipient of the incoming call is given additional information before acknowledging receipt of, and responding to, the incoming call.

Optionally, a background sound sensor 35 (which optionally treats all background sound as "noise") senses and processes the background sound level that is present locally and sets an initial sound intensity level for user notification of the incoming call based on this sensed background sound level. That is, if the background sound level is (i) relatively low, (ii) at a medium level or (iii) relatively high, the user notification sound level is adjusted accordingly by an adaptive volume control mechanism 33.

Optionally, a user proximity sensor 37 estimates a present distance between the user and the radiotelephone and adjusts the user's notification sound level for an incoming call based on this estimated distance. Optionally, a user notification sound level for an incoming call is adjusted based on both the sensed background sound level and the estimated distance of the user from the radiotelephone. This user notification sound level may be adjusted continuously or may be adjusted in increments, based on which of several ranges of background sound level applies and on which of several ranges of estimated user distance applies.

Optionally, after an initial notification sound level for an incoming call is determined and the (first) voice-based DA signal is delivered, if the user does not promptly respond by activating the radiotelephone to answer the incoming call, the DA signal can be redelivered at an incrementally increased notification sound level, up to a reasonable maximum sound level.

Figure 2A:
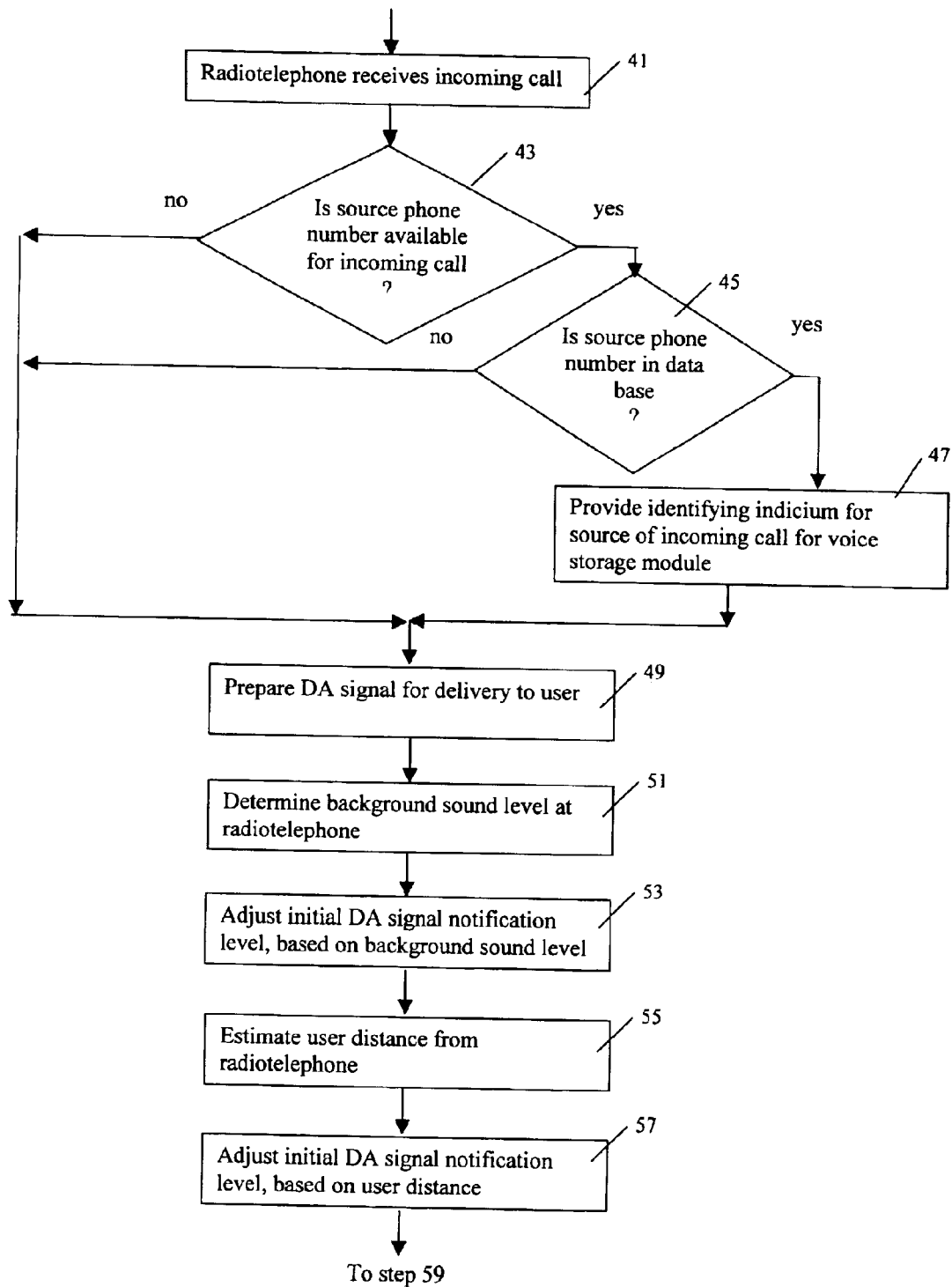
FIGS. 2A and 2B are a flow chart for practising the invention.
Figure 2B:
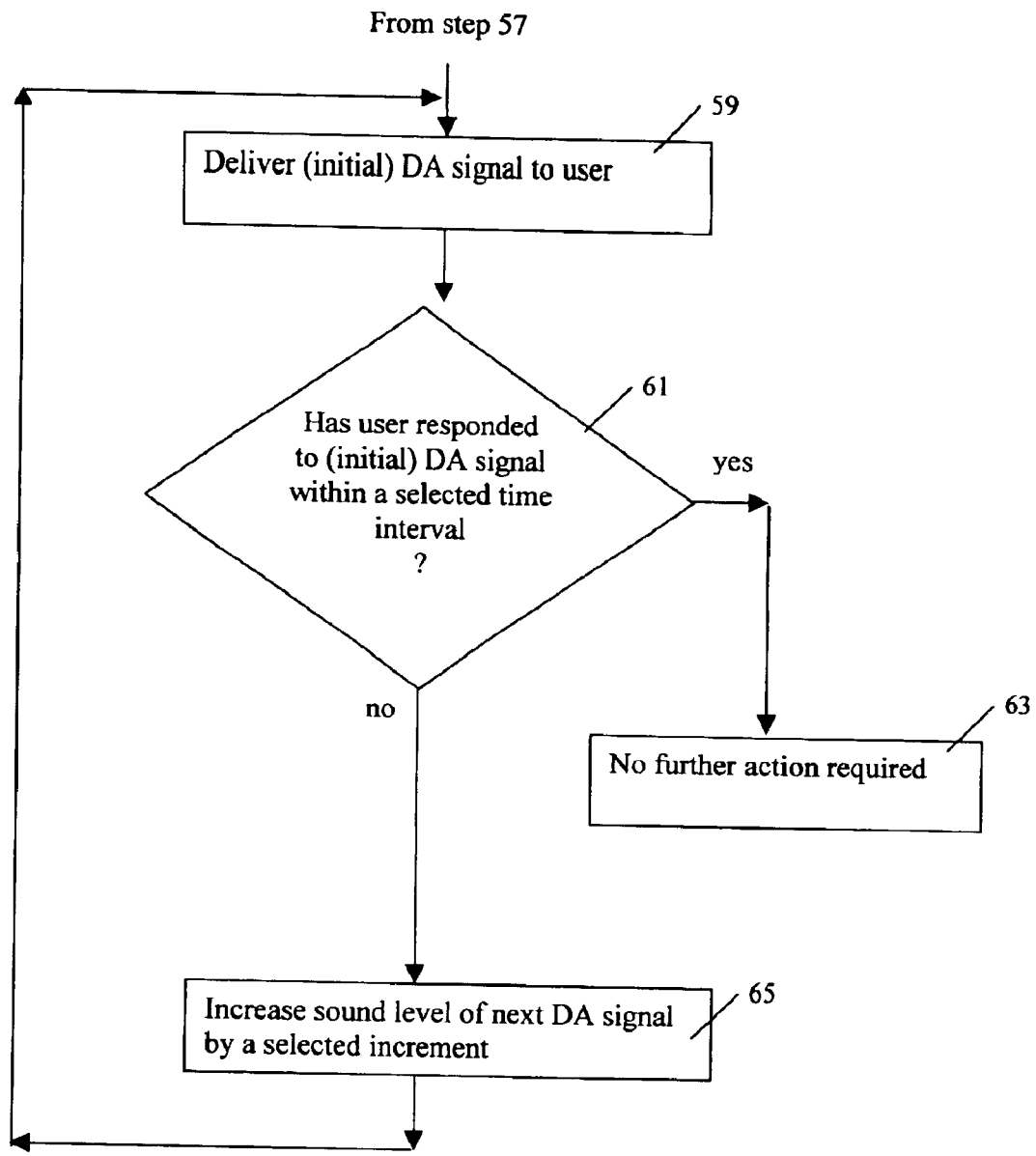

FIG. 2 is a flow chart illustrating a procedure for practising the invention. In step 41, a radiotelephone system receives an incoming call. In step 43, the system determines if a source phone number is available for the incoming call. If the answer to the query in step 43 is "no," the system moves to step 49.

If the answer to the query in step 43 is "yes," the system consults an on-board database and determines if the source phone number is in the data base, in step 45. If the answer to the query in step 45 is "no," the system moves to step 49. If the answer to the query in step 45 is "yes," the system obtains an identifying indicium (e.g., a name and/or occupation and/or other identifier) for the source phone number and provides this indicium for a voice storage module, in step 47. In step 49, the system prepares a DA signal, optionally identifying the source phone number, for delivery to the user.

The system optionally determines the background sound level that is present locally, in step 51, and adjusts the initial DA signal notification sound level according to this background sound level, in step 53. The system optionally estimates a distance of the user from the radiotelephone, in step 55, and adjusts the initial DA signal notification sound level according to this estimated distance, in step 57. Optionally, steps 53 and 57 are combined.

The system delivers an initial voice-based DA signal to the user, in step 59. In step 61, the system optionally determines if the user has responded to this initial DA signal within a selected time interval (e.g., within 3–9 sec). If the answer to the query in step 61 is "yes," the system takes no further action, in step 63. If the answer to the query in step 61 is "no," the system optionally increases the sound level of the (next) voice-based DA signal by a selected increment and returns to step 59 to deliver another DA signal concerning this incoming call.

The invention provides a DA signal that allows a radiotelephone user to promptly determine whether an incoming call is intended for that user. The invention also provides at least three types of adaptive sound level control, based on: (1) the present environmental sound level; (2) an estimated distance from the user to the user's radiotelephone; and/or (3) the length of time that elapses between delivery of the initial incoming call DA signal and acknowledgment by the user of receipt of this incoming call DA signal.

What is claimed is:

1. A method for indicating receipt of an incoming call on a radiotelephone, the method comprising:

receiving a signal indicating an incoming call on a radiotelephone;

providing a selected voice-based distinguishable alert signal, having a first associated sound intensity value and including at least three audibly perceptible, voice-based words;

estimating a value of a background sound level that is present at the radiotelephone at a time the incoming call signal is received;

when the background sound level value is less than a selected threshold background sound value, providing the incoming call notification signal at the first sound intensity value; and when the background sound level value is at least equal to the threshold background sound value, providing the incoming call notification signal at a second sound intensity value that is larger than the first sound intensity value.

2. The method of claim 1, further comprising:

determining if said incoming call has an associated source phone number; and when said incoming call has an associated phone number, providing said incoming call notification signal with at least one audibly perceptible, voice-based word that identifies at least one source of said incoming call.

3. The method of claim 1, further comprising:
  determining if said incoming call has an associated source phone number;
  when said incoming call has an associated phone number, determining if the source phone number is contained in a database associated with said radiotelephone; and
  when the source phone number is contained in the database, providing said incoming call notification signal with at least one audibly perceptible, voice-based word that identifies at least one source of said incoming call.

4. The method of claim 3, further comprising:
  when said source phone number is not contained in said database, providing a database modification means to allow information concerning said source phone number to be added to said database.

5. The method of claim 1, further comprising providing said voice-based signal using at least one of: a voice of a user of said radiotelephone, a voice of a person other than a user of said radiotelephone, and a synthesized voice sound.

6. A system for indicating receipt of an incoming call on a radiotelephone, the system comprising:
  a radiotelephone that is capable of receiving a signal indicating an incoming call on the radiotelephone; and
  an incoming call mechanism that:
    provides a selected voice-based distinguishable alert signal, having a first associated sound intensity value and including at least three audibly perceptible, voice-based words;
    estimates a value of a background sound level that is present at the radiotelephone at a time the incoming call signal is received;
    when the background sound level value is less than a selected threshold background sound value, provides the incoming call notification signal at the first sound intensity value; and
    when the background sound level value is at least equal to the threshold background sound value, provides the incoming call notification signal at a second sound intensity value that is larger than the first sound intensity value.

7. The system of claim 6, wherein said incoming call mechanism:
  determines if said incoming call has an associated source phone number; and
  when said incoming call has an associated phone number, provides said incoming call notification signal with at least one audibly perceptible, voice-based word that identifies at least one source of said incoming call.

8. The system of claim 6, wherein said incoming call mechanism:
  determines if said incoming call has an associated source phone number;
  when said incoming call has an associated phone number, determines if the source phone number is contained in a database associated with said radiotelephone; and
  when the source phone number is contained in the database, provides said incoming call notification signal with at least one audibly perceptible, voice-based word that identifies at least one source of said incoming call.

9. The system of claim 8, wherein:
  when said source phone number is not contained in said database, said incoming call mechanism provides a database modification means to allow information concerning said source phone number to be added to said database.

10. The system of claim 6, wherein said incoming call mechanism provides said voice-based signal using at least one of: a voice of a user of said radiotelephone, a voice of a person other than a user of said radiotelephone, and a synthesized voice sound.

11. A method for indicating receipt of an incoming call on a radiotelephone, the method comprising:
  receiving a signal indicating an incoming call on a radiotelephone;
  providing a selected voice-based distinguishable alert signal, having an associated sound intensity value and including at least three audibly perceptible, voice-based words;
  determining an accumulated time after the incoming call notification signal is first provided, during which a user of the radiotelephone does not respond to the notification signal; and
  when the accumulated time exceeds a selected time value, providing a second incoming call notification signal having a sound intensity value that is greater than the first sound intensity value.

12. The method of claim 11, further comprising:
  determining if said incoming call has an associated source phone number; and
  when said incoming call has an associated phone number, providing said incoming call notification signal with at least one audibly perceptible, voice-based word that identifies at least one source of said incoming call.

13. The method of claim 11, further comprising:
  determining if said incoming call has an associated source phone number;
  when said incoming call has an associated phone number, determining if the source phone number is contained in a database associated with said radiotelephone; and
  when the source phone number is contained in the database, providing said incoming call notification signal with at least one audibly perceptible, voice-based word that identifies at least one source of said incoming call.

14. The method of claim 13, further comprising:
  when said source phone number is not contained in said database, providing a database modification means to allow information concerning said source phone number to be added to said database.

15. The method of claim 11, further comprising providing said voice-based signal using at least one of: a voice of a user of said radiotelephone, a voice of a person other than a user of said radiotelephone, and a synthesized voice sound.

16. A system for indicating receipt of an incoming call on a radiotelephone, the system comprising:
  a radiotelephone that is capable of receiving a signal indicating an incoming call on the radiotelephone; and
  an incoming call mechanism that:
    provides a selected voice-based distinguishable alert signal, having an associated sound intensity value and including at least three audibly perceptible, voice-based words;
    determines an accumulated time after the incoming call notification signal is first provided, during which a user of the radiotelephone does not respond to the notification signal; and when the accumulated time exceeds a selected time value, provides a second incoming call notification signal having a sound intensity value that is greater than the first sound intensity value.

17. The system of claim 16, wherein said incoming call mechanism:
   determines if said incoming call has an associated source phone number; and
   when said incoming call has an associated phone number, provides said incoming call notification signal with at least one audibly perceptible, voice-based word that identifies at least one source of said incoming call.

18. The system of claim 16, wherein said incoming call mechanism:
   determines if said incoming call has an associated source phone number;
   when said incoming call has an associated phone number, determines if the source phone number is contained in a database associated with said radiotelephone; and
   when the source phone number is contained in the database, provides said incoming call notification signal with at least one audibly perceptible, voice-based word that identifies at least one source of said incoming call.

19. The system of claim 18, wherein:
   when said source phone number is not contained in said database, said incoming call mechanism provides a database modification means to allow information concerning said source phone number to be added to said database.

20. The system of claim 16, wherein said incoming call mechanism provides said voice-based signal using at least one of: a voice of a user of said
   radiotelephone, a voice of a person other than a user of said radiotelephone, and a synthesized voice sound.

* * * * *